Aug. 6, 1940. J. BROWN Re. 21,522

ONE-PIECE DRESS

Original Filed Aug. 1, 1938

INVENTOR
Jennie Brown
BY Sollen & Holcombe
ATTORNEY

Reissued Aug. 6, 1940

Re. 21,522

UNITED STATES PATENT OFFICE 21,522

ONE-PIECE DRESS

Jennie Brown, Red Bay, Ala.

Original No. 2,154,227, dated April 11, 1939, Serial No. 222,376, August 1, 1938. Application for reissue November 25, 1939, Serial No. 306,193

6 Claims. (Cl. 2—74)

This invention relates to new and useful improvements in a one piece dress.

More specifically, the invention proposes the construction of a one piece dress characterized by a rectangular strip of cloth material adapted to encircle the body, with the top edge thereof constructed so as to form the neck opening of said dress.

Still further it is proposed to provide a cord mounted upon the top longitudinal edge of the rectangular strip and which is adapted to be used for constricting the said edge to form the neck opening.

Still further it is proposed to provide cooperative fastening elements upon the ends of the strip for joining these ends together to close the back of the dress.

Another object of this invention is the provision of a pair of crescent shaped openings with the ends thereof directed towards the longitudinal top edge of said strip of cloth material to form openings for the arms with the material between the said ends forming shoulder portions for the dress.

Still further it is proposed to provide triangular shaped members which are adapted to be secured between the adjacent end portions of the crescent shaped openings for closing this area to such a degree that only the arms will be capable of projecting therethrough.

Anoter object of this invention is the provision of a lace between the opposite edges of the end portions of the crescent shaped openings which are adapted to have their ends tied together for holding the sides of the openings in position with relation to each other.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The one piece dress, according to this invention, includes a rectangular strip of cloth material 10 which is adapted to encircle one's body and has a longitudinal top edge 10ᵃ adapted to form the neck opening of the dress. The rectangular strip of cloth material is provided with a binding strip 11 securely attached to the bottom edge thereof by means of stitches passing therethrough. The front of the rectangular strip of cloth material 10 may be decorated in any desired manner for adding to the appearance of the garment, which may be constructed from any desired material.

Figure 3:
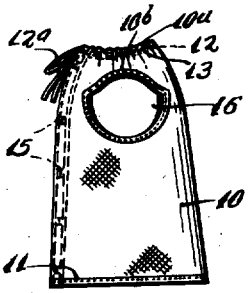
Fig. 3 is a view looking in the direction of the line 3—3 of Fig. 2.

A cord 12 is mounted on the top longitudinal edge for contracting the said edge to form the neck opening. A portion of the longitudinal top edge is doubled upon itself and held in position by means of stitches 13 for forming a passageway 14 through which the cord 12 is passed. The ends of the strip of cloth material 10 are adapted to be pushed together towards the center of the cord 12 to a desired position which will permit the edge to freely pass around one's neck to permit the ends of the cord 12ᵃ to be tied together as shown in Fig. 3 for holding the top edge in its contracted position.

Figure 4:
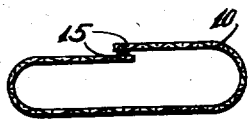
Fig. 4 is a sectional view on the line 4—4 of Fig. 2.
Figure 5:
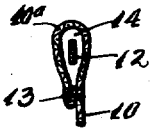
Fig. 5 is an enlarged sectional view on the line 5—5 of Fig. 1.

Fastening elements 15 are mounted on the ends of the strip of material 10 for joining the ends together to close the dress at the back. As shown in Fig. 4, the ends of the strip of cloth material 10 are adapted to be overlapped for permitting the fastening elements 15 to be joined together for closing the dressing at the back. The fastening elements are in the form of snap fasteners.

Figure 1:
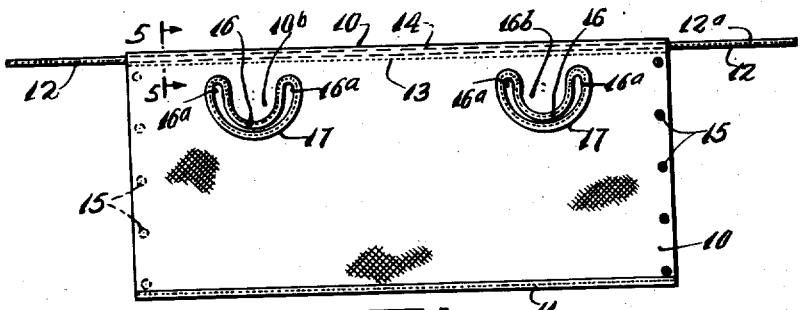
Fig. 1 is a developed view of a one piece dress constructed according to this invention.
Figure 2:
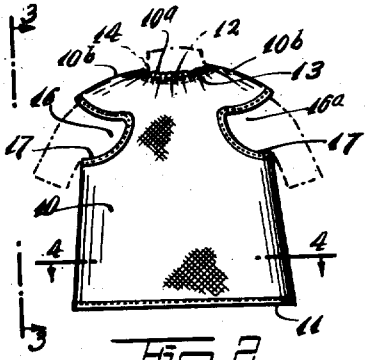
Fig. 2 is a front elevational view of a dress showing the position it would assume on the body.

The strip of cloth material 10 is formed with a pair of crescent shaped openings 16 with the ends 16ᵃ thereof directed towards the longitudinal top edge 10ᵃ to form openings for one's arms with the material 10ᵇ between the ends 16ᵃ forming shoulder portions for the dress. A binding strip 17 is secured to the edges of the openings 16 for preventing the same from unravelling. As shown in Fig. 2, when the dress is positioned upon the body the arms are adapted to project through the openings 16 with the material 10b between the ends 16a resting directly upon the shoulders to form the shoulder portions of the dress.

For positioning the one piece dress upon one's body the top longitudinal edge 10a is brought into a position with relation to the neck and one's arms are passed through the openings 16 and the ends of the strip 10 are passed to the rear of the body. The ends of the longitudinal top edge 10a are urged towards the center of the cord 12 to contract this edge to form the neck openings, and the ends 12a of the cord are tied together for holding the top edge 10a in its contracted condition. For closing the adjacent ends of the strip of material 10 the snap fasteners 15 are interengaged with relation to each other for closing the body of the dress.

Figure 6:
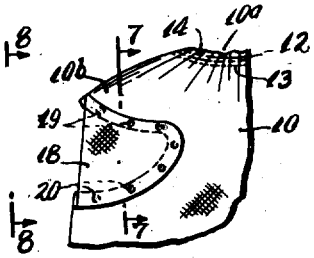
Fig. 6 is an enlarged detailed view of a portion of Fig. 2 but illustrating a modification of the invention.
Figure 7:
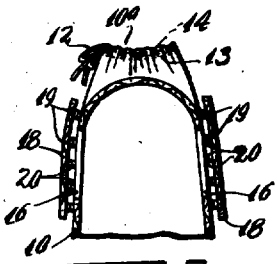
Fig. 7 is a sectional view on the line 7—7 of Fig. 6.
Figure 8:
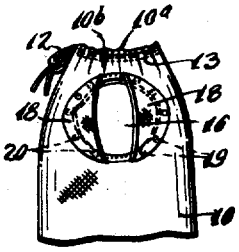
Fig. 8 is a view looking in the direction of the line 8—8 of Fig. 6.

According to the modification of the invention shown in Figs. 6–8 inclusive, a means is provided for extending across the end portions of the openings 16 to decrease the size of these openings to a degree where only the arms will extend therethrough. This means comprises triangularly shaped members 18 extending between the adjacent edges of the end portions of the openings 16 at the front and rear of the dress as shown in Fig. 7. Snap fastener elements 19 are mounted on the edges of the members 18 and are adapted to be engaged with complementary snap fastener elements 20 mounted upon the edges of the end portions of the openings 16 for holding the members 18 in position upon the garment in a manner so as to extend across the end portions of the openings. In other respects this form of the invention is similar to the previous form.

Figure 9:
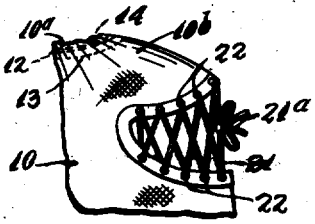
Fig. 9 is a view illustrating another portion of a one piece dress constructed according to still another modification of the invention.

According to the modification shown in Fig. 9 a means is provided which extends between the opposite edges of the end portions of the openings for holding these end portions in fixed positions with relation to each other. This means comprises a lace 21 which passes through apertures 22 formed in the edge portions of the end portions of the openings 16. The ends 21a of the laces 21 are adapted to be tied together for holding the lace in its adjusted positions to hold the end portions of the openings in fixed position with relation to each other. These laces are also formed on the front and rear of the garment. In other respects this form of the invention is similar to the previous forms.

Figure 10:
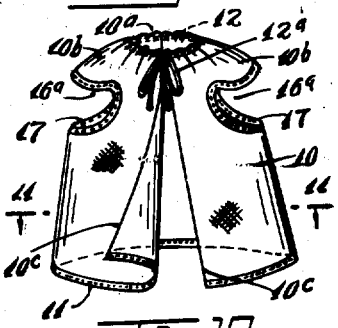
Fig. 10 is a rear perspective view of the garment, illustrating another form of the invention.
Figure 11:
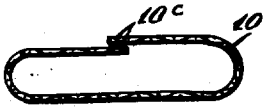
Fig. 11 is a sectional view on the line 11—11 of Fig. 10.

In Figs. 10 and 11, the rear vertical edges 10c of the cloth material 10 are shown to be adjacent to one another, without any snap-fasteners or any other joining means, except the cord 12 which is adapted to contract the upper edge of the neck opening.

It is to be understood that this garment may be used with or without the rear joining fasteners of edges 10c and the garment may be readily used as an infant feeding wrap-around apron.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

I claim:

1. A one piece dress, comprising a strip of cloth material having parallel top and bottom horizontal edge portions and vertical end edge portions, a cord mounted on said top edge portion for contracting the same to form a neck opening for said dress, means for releasably attaching together said end edge portions, and said strip of cloth material being formed with a pair of crescent shaped slots with the ends thereof extended towards said top edge, the portions of material to the top and within the crescent shaped slots being adapted to extend over one's shoulder forming shoulder covering portions, the portions of material below the crescent shaped slots being adapted to extend along the sides of a wearer of the dress, and the openings formed by lifting the shoulder covering portions producing arm openings for the dress and extend beneath the wearer's arm pits for forming large side ventilation openings.

2. A one piece dress, comprising a rectangular strip of cloth material adapted to encircle one's body and having a longitudinal top edge adapted to form the neck opening of said dress, a cord mounted on said top longitudinal edge and contracting said edge to form said neck opening, fastening elements upon the ends of said strip for joining the ends to close said dress, and said strip of cloth material being formed with a pair of crescent shaped openings with the ends thereof extended towards said longitudinal top edge to form openings for one's arms and with the material between the said ends forming shoulder portions for said dress, and triangular shaped members secured across the end portions of said openings.

3. A one piece dress comprising a rectangular strip of cloth material adapted to encircle one's body and having a longitudinal top edge adapted to form the neck opening of said dress, a cord mounted on said top longitudinal edge and contracting said edge to form said neck opening, fastening elements upon the ends of said strip for joining the ends to close said dress, and said strip of cloth material being formed with a pair of crescent shaped openings with the ends thereof extended towards said longitudinal top edge to form openings for one's arms and with the material between the said ends forming shoulder portions for said dress, and triangular shaped members secured across the end portions of said openings, cooperative snap fasteners mounted upon the adjacent edges of said triangular shaped members and the end portions of said openings for securing said members to said dress.

4. A one piece dress, comprising a rectangular strip of cloth material adapted to encircle one's body and having a longitudinal top edge adapted to form the neck opening of said dress, a cord mounted on said top longitudinal edge and contracting said edge to form said neck opening, fastening elements upon the ends of said strip for joining the ends to close said dress, and said strip of cloth material being formed with a pair of crescent shaped openings with the ends thereof extended towards said longitudinal top edge to form openings for one's arms and with the material between the said ends forming shoulder portions for said dress, and a lace between the opposite edges of the end portions of said openings.

5. A one piece dress, comprising a rectangular strip of cloth material adapted to encircle one's body and having a longitudinal top edge adapted to form the neck opening of said dress, a cord mounted on said top longitudinal edge and contracting said edge to form said neck opening, fastening elements upon the ends of said strip for joining the ends to close said dress, and said strip of cloth material being formed with a pair of crescent shaped openings with the ends thereof extended towards said longitudinal top edge to form openings for one's arms and with the material between the said ends forming shoulder portions for said dress, and a lace between the opposite edges of the end portions of said openings, the material forming the end portions of said openings having apertures through which said lace is passed.

6. A one piece dress, comprising a strip of substantially flat material having top, bottom and end edge portions, a cord mounted on said top edge portion for contracting the same to form a neck opening for said dress and for releasably attaching together said end edge portions, and said strip of substantially flat material being formed with a pair of crescent shaped slots with the ends thereof extended towards said top edge, the portions of material to the top and within the crescent shaped slots being adapted to extend over one's shoulder forming shoulder covering portions, the portions of material below the crescent shaped slots being adapted to extend along the sides of a wearer of the dress, and the openings formed by lifting the shoulder covering portions producing arm openings for the dress and extending beneath the wearers' arm pits for forming large side ventilation openings.

JENNIE BROWN.